(12) United States Patent  
Rettig et al.

(10) Patent No.: US 8,509,709 B2
(45) Date of Patent: Aug. 13, 2013

(54) CONSUMER ELECTRONIC DEVICE HAVING A DISTRIBUTED FORM FACTOR MILLIMETER WAVE RECEIVER AND TRANSMITTER

(75) Inventors: Daniel Rettig, Karkur (IL); Eli Yona, Binyamina (IL); Jorge Myszne, Zikhron Ya'akov (IL)

(73) Assignee: Wilocity, Ltd., Caesarea (IL)

( * ) Notice: Subject to any disclaimer, the term of this patent is extended or adjusted under 35 U.S.C. 154(b) by 503 days.

(21) Appl. No.: 12/536,941

(22) Filed: Aug. 6, 2009

(65) Prior Publication Data

US 2010/0035561 A1  Feb. 11, 2010

Related U.S. Application Data

(60) Provisional application No. 61/086,924, filed on Aug. 7, 2008.

(51) Int. Cl.
H04B 1/38 (2006.01)
H04M 1/00 (2006.01)

(52) U.S. Cl.
USPC .......................................... 455/73; 455/550.1

(58) Field of Classification Search
None
See application file for complete search history.

(56) References Cited

U.S. PATENT DOCUMENTS

| | | | |
|---|---|---|---|
| 6,801,755 B2 * | 10/2004 | Kardach et al. | 455/41.2 |
| 7,002,511 B1 * | 2/2006 | Ammar et al. | 342/134 |
| 2002/0178390 A1 * | 11/2002 | Lee | 713/320 |
| 2003/0026356 A1 * | 2/2003 | Brommer | 375/324 |
| 2003/0210191 A1 * | 11/2003 | Mohammadian et al. | 343/702 |
| 2005/0185364 A1 | 8/2005 | Bell et al. | |
| 2007/0049213 A1 * | 3/2007 | Tran | 455/78 |
| 2008/0075209 A1 * | 3/2008 | Li et al. | 375/347 |
| 2008/0106476 A1 | 5/2008 | Tran et al. | |
| 2009/0045961 A1 | 2/2009 | Chamarti et al. | |
| 2009/0070991 A1 | 3/2009 | Saboune | |
| 2009/0322643 A1 * | 12/2009 | Choudhury | 343/851 |

* cited by examiner

Primary Examiner — Yuwen Pan
Assistant Examiner — Ayodeji Ayotunde
(74) Attorney, Agent, or Firm — Myers Wolin, LLC

(57) ABSTRACT

A consumer electronic device having distributed form factor millimeter wave receiver and transmitter comprising a first motherboard part including a baseband module; a second motherboard part including a receive (RX) active antenna, wherein the RX active antenna is connected to the baseband module using a pair of cables; and a third motherboard part including a transmit (TX) active antenna, wherein the TX active antenna is connected to the baseband module using a pair of cables.

11 Claims, 4 Drawing Sheets

US 8,509,709 B2

CONSUMER ELECTRONIC DEVICE HAVING A DISTRIBUTED FORM FACTOR MILLIMETER WAVE RECEIVER AND TRANSMITTER

CROSS-REFERENCE TO RELATED APPLICATION

This application claims the benefit of U.S. provisional application No. 61/086,924 filed on Aug. 7, 2008, the contents of which are herein incorporated by reference.

TECHNICAL FIELD

The present invention relates generally to transmitting and receiving millimeter wave signals.

BACKGROUND OF THE INVENTION

The 60 GHz band is an unlicensed band which features a large amount of bandwidth and a large worldwide overlap. The large bandwidth means that a very high volume of information can be transmitted wirelessly. As a result, multiple applications, that require transmission of a large amount of data, can be developed to allow wireless communication around the 60 GHz band. Examples for such applications include, but are not limited to, wireless high definition TV (HDTV), wireless docking station, wireless Gigabit Ethernet, and many others.

In order to facilitate such applications there is a need to develop integrated circuits (ICs), such as amplifiers, mixers, radio frequency (RF) analog circuits, and active antennas that operate in the 60 GHz frequency range. Such circuits should be fabricated and packaged as a single IC (chip) that can be assembled on a printed circuit board (PCB). The size of the package may range from several to a few hundred square millimeters. In addition, there is a need to solve problems resulting from the current assembly of electronic devices, such as laptop computers in order to enable efficient transmission and reception of millimeter wave signals.

A prime example for such a problem is illustrated in FIG. 1, which shows a typical assembly of a laptop computer 100 having radio transmission capabilities. A motherboard 110 of the computer 100 includes a RF module 120 that receives and transmits RF signals through a receive antenna 130 and a transmit antenna 140, which are located in the lid 150. Signals from the RF module 120 to antennas 130 and 140 are transferred over wires 160. The motherboard 110 is assembled in the base part of the computer 110, which is relatively cooler than the lid 150, therefore the RF module 120 is installed therein.

The form factor of the assembly illustrated in FIG. 1 cannot be adapted to enable the integration of 60 GHz communication applications in consumer electronics products, primarily because transferring high frequency signals over the wires 160 significantly attenuate the signals. Increasing the power of the signals at the RF module 120 would require designing complex and expensive RF circuits of the module 120. Thus, such assembly is not feasible for commercial uses in consumer electronics products of 60 GHz communication applications.

It would be therefore advantageous to provide a solution for assembling a computing device having a form factor suitable for use in at least the 60 GHz band.

SUMMARY OF THE INVENTION

Certain embodiments of the invention include a distributed form factor millimeter wave radio apparatus. The apparatus comprises a first motherboard part including a baseband module, wherein the first motherboard part is mounted on a first plane of a portable computing device; a second motherboard part including a receive (RX) active antenna, wherein the second motherboard part is mounted on a second plane of the portable computing device; and a third motherboard part including a transmit (TX) active antenna, wherein the third motherboard part is mounted on a second plane of the portable computing device.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
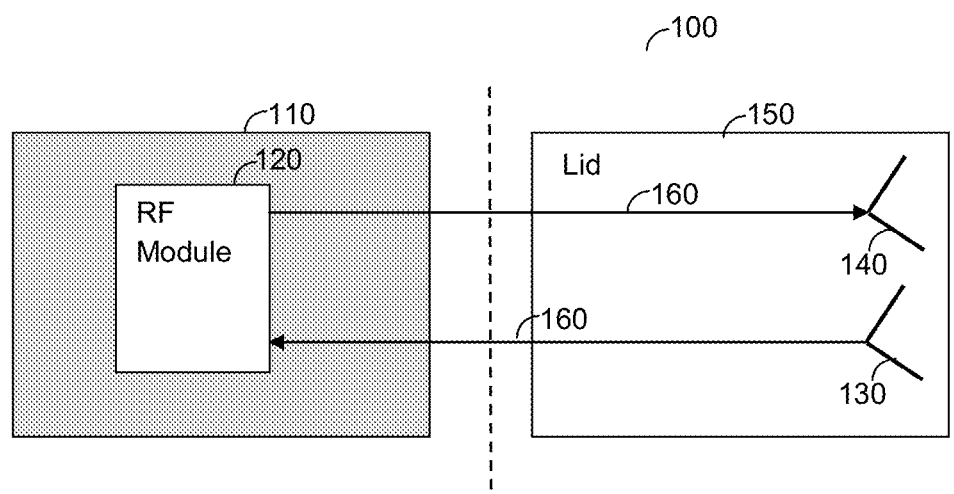
FIG. 1 is a typical assembly of a laptop computer having radio transmission capabilities.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention comprise a distributed form factor of a motherboard and active antennas that enables the efficient transmission and reception of signals in at least the 60 GHz band. A form factor of a motherboard typically determines the specifications for its general shape and size. It also specifies what type of case and power supply will be supported, the placement of mounting holes, and the physical layout and organization of the board.

Figure 2A:
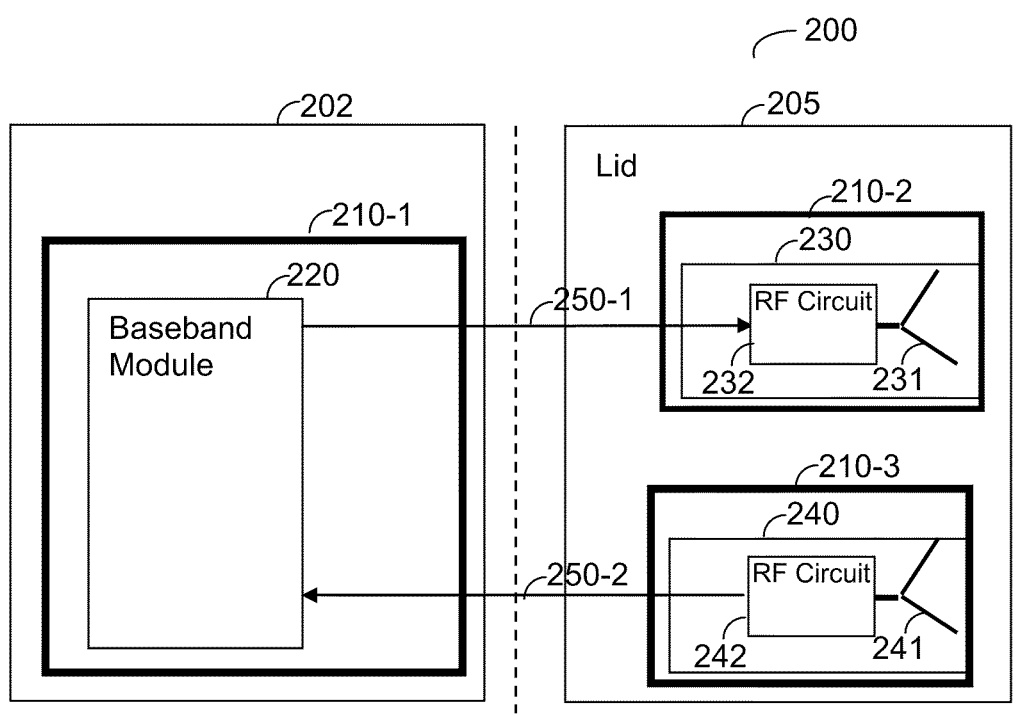
FIGS. 2A and 2B are schematic diagrams of a laptop computer assembled in accordance with an embodiment of the invention.
Figure 2B:
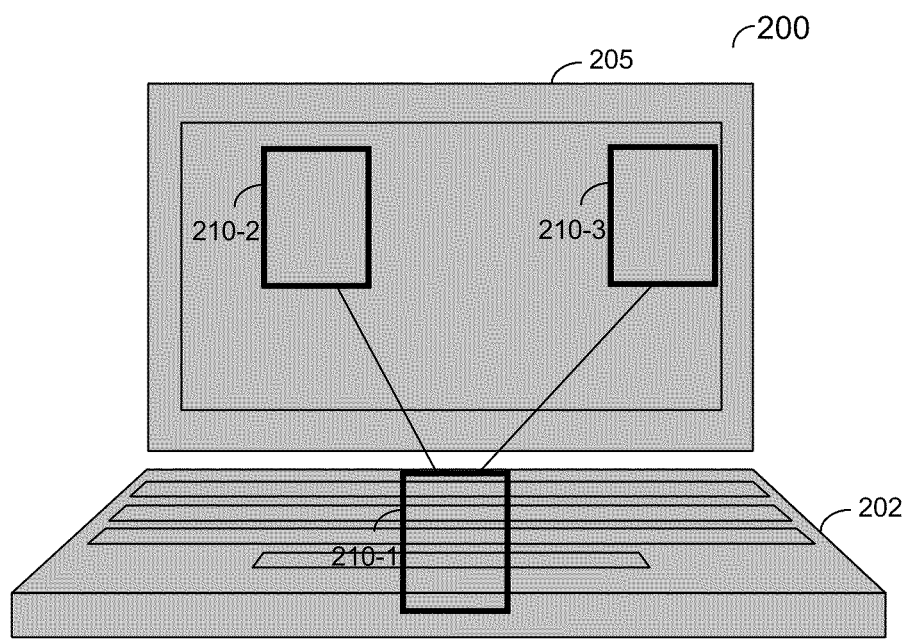

A schematic diagram of a laptop computer 200 assembled in accordance with the teachings of an embodiment of the invention is shown in FIGS. 2A and 2B. In accordance with an embodiment of the invention the form factor of a motherboard is spread between the base 202 and lid planes 205 of a laptop computer 200. Specifically, the motherboard consists of three parts 210-1, 210-2 and 210-3 which receptively include a baseband module 220, a receiver (RX) active antenna 230, and a transmitter (TX) active antenna 240. As shown in FIG. 2B, the part 210-1 is in the base plane 202 of the computer 200 and parts 210-2 and 210-3 are in the lid plane 205. In one embodiment of the invention the RX and TX antennas are of the same type and only one antenna is used for reception and transmission of signals.

Referring back to FIG. 2A, two cables 250-1 and 250-2 are utilized to transfer signals from and to the baseband module 220 and the active antennas 230 and 240. These signals include power, control, baseband, and local oscillator source (LO). The baseband signals transferred to each of the active antennas 230 and 240 include two I and Q signals having the same frequency but shifted in phase. Thus, in accordance with an embodiment of the invention five signals are transferred from the baseband module 220 to each of the active antennas 230 and 240. It should be appreciated by one of ordinary skill in the art that the baseband and LO signals are characterized as low frequency and low power radio signals. For example, the baseband signals are in the range of approximately 900 MHz, while the LO signal is in the range of 7-8 GHz. In certain embodiments of the invention, the I and Q baseband signals are replaced with intermediate frequency (IF) signals.

The RX active antenna 230 integrates an antenna 231 and an RF circuit 232 mounted on the motherboard part 210-3. The antenna 231 receives high frequency (e.g., 60 GHz) signals, which are down converted, by the RF circuit 232, to I and Q baseband signals using the LOs. The control signals control the RF circuit 232. Similarly, the TX active antenna 240 includes an RF circuit 242 for at least up converting I and Q baseband signals using the LOs to high frequency signals which are transmitted through an antenna 241. It would be appreciated that only low frequency signals are transferred between the lid plane 205 and the base plane 202, therefore the attenuation of these signals is significantly less than of high frequency signals. Thus, the RX and TX active antennas 230 and 240 do not need to compensate on gain losses. In other embodiments of the invention, the RF circuits 232 and 242 are integrated in a single chip that performs tasks mentioned above.

Figure 3:
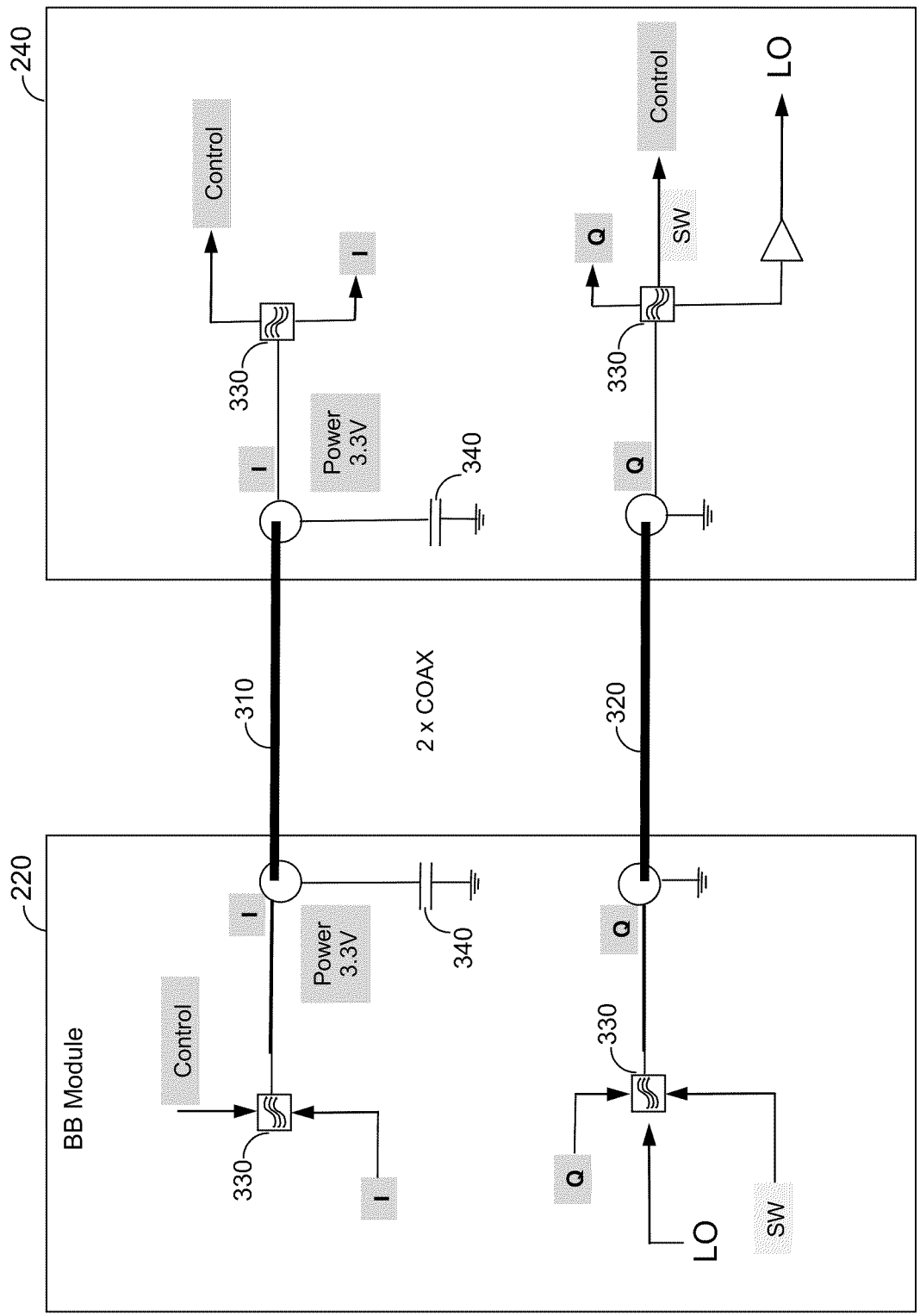
FIG. 3 is a diagram illustrating the interface between a baseband module and an active antenna as implemented in accordance with an embodiment of the invention.

In accordance with certain embodiments for practicing the invention, a cable 250-1 or 250-2 comprises a pair of coax cables for transferring five signals. FIG. 3 shows an exemplary diagram illustrating the interface between the baseband module 220 and the TX active antenna 240. The I-baseband, control and power signals are simultaneously transferred over a coax cable 310, while the Q-baseband, control and LO signals are carried over a coax cable 320. The signals are combined and separated by means of frequency diplexers 330 and the RC networks 340. The frequency signals are combined by using diplexers 330 while the DC power and control signals are combined by means of the RC networks 340. Other analog devices, such as Ferrites and inductors may also be utilized for this purpose.

A diplexer 330 is a passive device that implements frequency domain multiplexing. Input signals are multiplexed onto an output signal. The input signals occupy disjoint frequency bands can coexist on the output signal without interfering with each other. For analog signal the diplexer 330 can de-multiplex an input signal to output signals (e.g., I-baseband, control signals and LO signals or Q-baseband, control, and power signals). A similar interface is implemented between the baseband module 220 and the RX active antenna 230.

It is important to note that these embodiments are only examples of the many advantageous uses of the innovative teachings herein. Specifically, the innovative teachings disclosed herein can be adapted in any type of consumer electronic devices where reception and transmission of millimeter wave signals is needed. Moreover, some statements may apply to some inventive features but not to others. In general, unless otherwise indicated, it is to be understood that singular elements may be in plural and vice versa with no loss of generality.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A distributed form factor millimeter wave radio apparatus, comprising:
   a first motherboard part including a baseband module, wherein the first motherboard part is mounted on a first plane of a portable computing device;
   a second motherboard part including only a receive (RX) active antenna, wherein the second motherboard part is mounted on a second plane of the portable computing device;
   a third motherboard part including only a transmit (TX) active antenna, wherein the third motherboard part is mounted on the second plane of the portable computing device, and wherein the second and third motherboard are physically decoupled;
   a first cable for connecting the baseband module to the second motherboard part; and
   a second cable for connecting the baseband module to the third motherboard part, wherein over the first cable and second cable intermediate frequency (IF) signals, a local oscillator frequency signal, a control signal, and a power signal are simultaneously transferred.

2. The radio apparatus of claim 1, wherein the portable computing device comprises at least a laptop computer.

3. The radio apparatus of claim 2, wherein the first plane is a base plane of the laptop computer and the second plane is a base of the laptop computer.

4. The radio apparatus of claim 1, wherein each of the second motherboard and the third motherboard further includes a frequency diplexer and a RC network.

5. The radio apparatus of claim 4, wherein each of the RX active antenna and the TX active antenna are connected to the frequency diplexer and the RC network to separate the IF signals, the local oscillator frequency signal, the control signal, and the power signal simultaneously received from the baseband module through the first cable and the second cable.

6. The radio apparatus of claim 5, wherein the IF signals consists of an I-baseband signal and a Q-baseband signal, wherein the I-baseband signal and the Q-baseband signal have the same frequency and a shifted in phase.

7. The radio apparatus of claim 6, wherein the IF signals and the local oscillator frequency signal are characterized as low frequency and low power signals to receive and transmit millimeter wave signals.

8. The radio apparatus of claim 7, wherein the RX active antenna is configured to receive millimeter wave signals.

9. The radio apparatus of claim 7, wherein the TX active antenna is configured to transmit millimeter wave signals.

10. The radio apparatus of claim 6, wherein over the first cable at least the I-baseband signal, the control signal and power signal are simultaneously transferred over the first cable, and wherein the Q-baseband signal, the control signal, and the local oscillator frequency signal over are simultaneously transferred the second cable.

11. The radio apparatus of claim 6, wherein the baseband module generates and simultaneously transfers the I-baseband signal, the Q-baseband signal, the control signal, and the power signal, and the local oscillator frequency signal.

* * * * *